Figure 1:
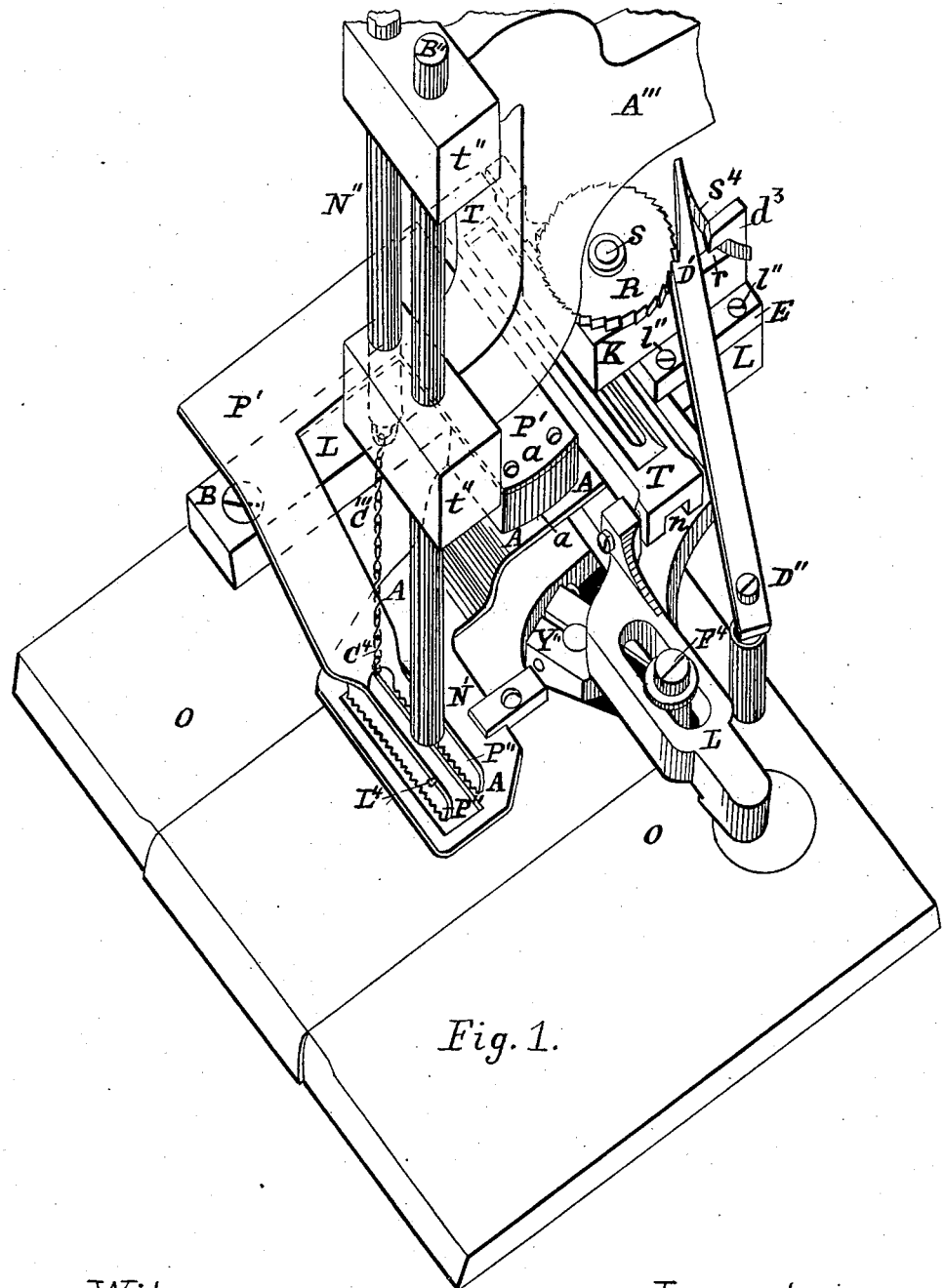

(Model.)

W. H. CARR.
BUTTON HOLE ATTACHMENT FOR SEWING MACHINES.

No. 256,817. Patented Apr. 25, 1882.

6 Sheets—Sheet 1.

(Model.)

W. H. CARR.
BUTTON HOLE ATTACHMENT FOR SEWING MACHINES.

No. 256,817.  Patented Apr. 25, 1882.

Witnesses:
Charles S. Brintnall
Harry P. Fielding

Inventor:
William Henry Carr
by W. E. Hagan his Atty.

(Model.)           W. H. CARR.          6 Sheets—Sheet 3.

BUTTON HOLE ATTACHMENT FOR SEWING MACHINES.

No. 256,817.          Patented Apr. 25, 1882.

Witnesses:
Charles S. Brintnall
Harry P. Fielding

Inventor:
William Henry Carr
by M. C. Hagan
his Atty.

(Model.)

6 Sheets—Sheet 4.

W. H. CARR.

BUTTON HOLE ATTACHMENT FOR SEWING MACHINES.

No. 256,817. Patented Apr. 25, 1882.

Witnesses:
Charles S. Brimhall
Harry P. Fielding

Inventor:
William Henry Carr
by W. E. Hagan
his Atty (Model.)

W. H. CARR.
BUTTON HOLE ATTACHMENT FOR SEWING MACHINES.

No. 256,817.  Patented Apr. 25, 1882.

6 Sheets—Sheet 5.

Witnesses:
Charles S. Brintnall
Harry P. Fielding

Inventor:
William Henry Carr
by W. E. Hagan
his Atty (Model.)  W. H. CARR.  6 Sheets—Sheet 6.

BUTTON HOLE ATTACHMENT FOR SEWING MACHINES.

No. 256,817.  Patented Apr. 25, 1882.

Witnesses:  Inventor:

UNITED STATES PATENT OFFICE.

WILLIAM H. CARR, OF LANSINGBURG, ASSIGNOR TO FREELAND W. OSTROM, OF TROY, NEW YORK.

BUTTON-HOLE ATTACHMENT FOR SEWING-MACHINES.

SPECIFICATION forming part of Letters Patent No. 256,817, dated April 25, 1882.

Application filed October 28, 1880. (Model.)

*To all whom it may concern:*

Be it known that I, WILLIAM HENRY CARR, of the village of Lansingburg, county of Rensselaer, and State of New York, have invented a new and useful Improvement in Button-Hole Attachments for Sewing-Machines, of which the following is a specification.

My invention consists in the combination of a ratchet-wheel and spur-wheel, a vertical shaft with a pawl, an endless chain having a crank pin or journal, and a blade-drum, all operating in the manner as hereinafter more fully set forth.

My invention further consists of a vertical shaft with a ratchet-wheel and spur-wheel, a pawl, an endless chain having a crank pin or journal, a flat blade-drum, a cloth carrying mechanism, and a bar, all operating in the manner as hereinafter described.

My invention further consists in the combination of an endless chain with an attached journal or pin, a blade-drum, cloth-carrying mechanism, and a spur-wheel, said parts operating in the manner as hereinafter described.

My invention further consists in the combination of an endless chain with an attached journal or pin, a flat blade-drum, bar, cloth-carrier, and spur-wheel, said parts operating in the manner as hereinafter more fully stated.

My invention further consists in the combination of a presser-foot, a chain capable of being hooked to or unhooked from the presser, a pivoted lever, and presser-bar, all arranged to operate in the manner as will be hereinafter more fully set forth.

Forming a part of this specification are six plates of drawings, containing thirteen figures, in all of which illustrations the same designation by letter-reference is used.

Figure 2:
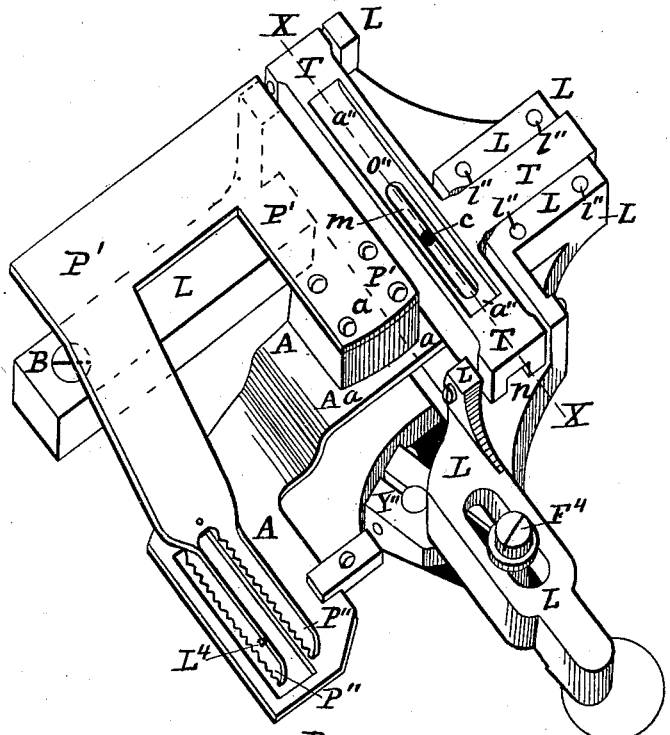
Figure 3:
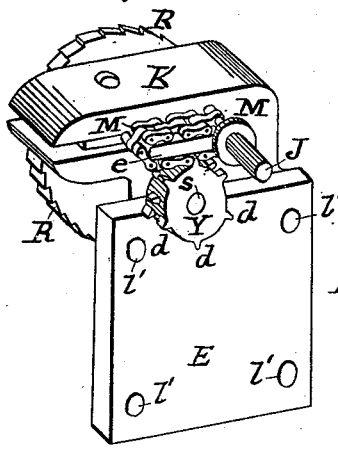
Figure 4:
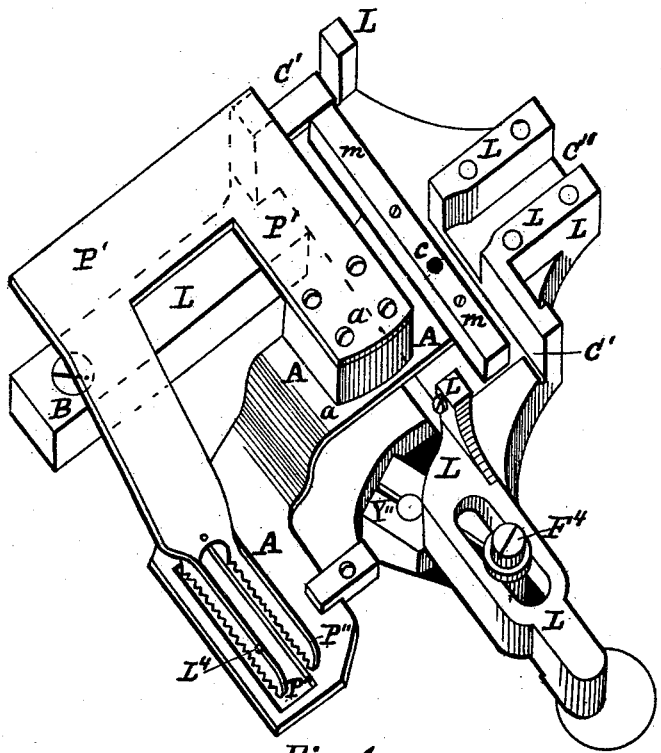
Figure 5:
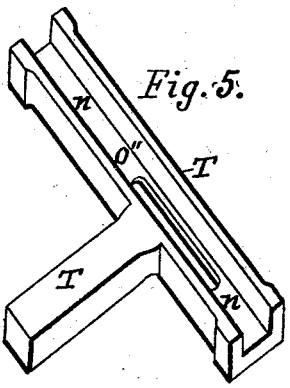
Figure 6:
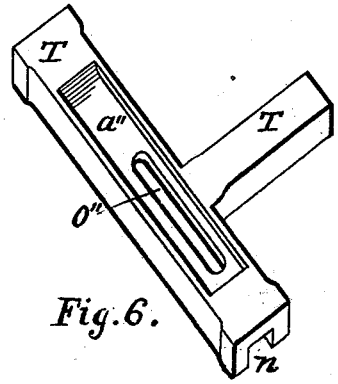
Figure 7:
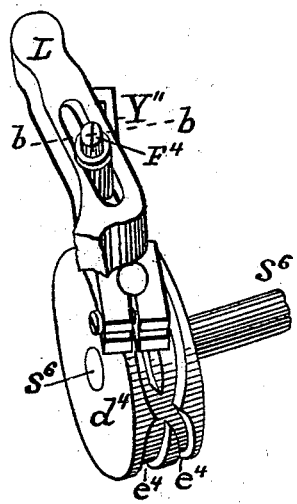
Figure 8:
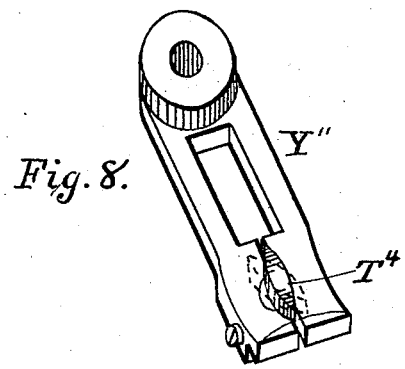
Figures 9, 10:
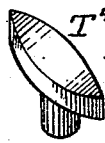
Figure 11:
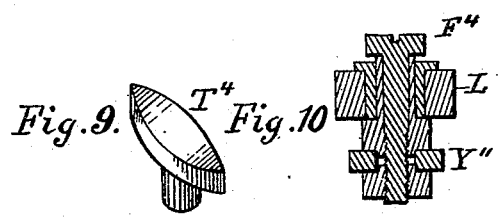
Figure 12:
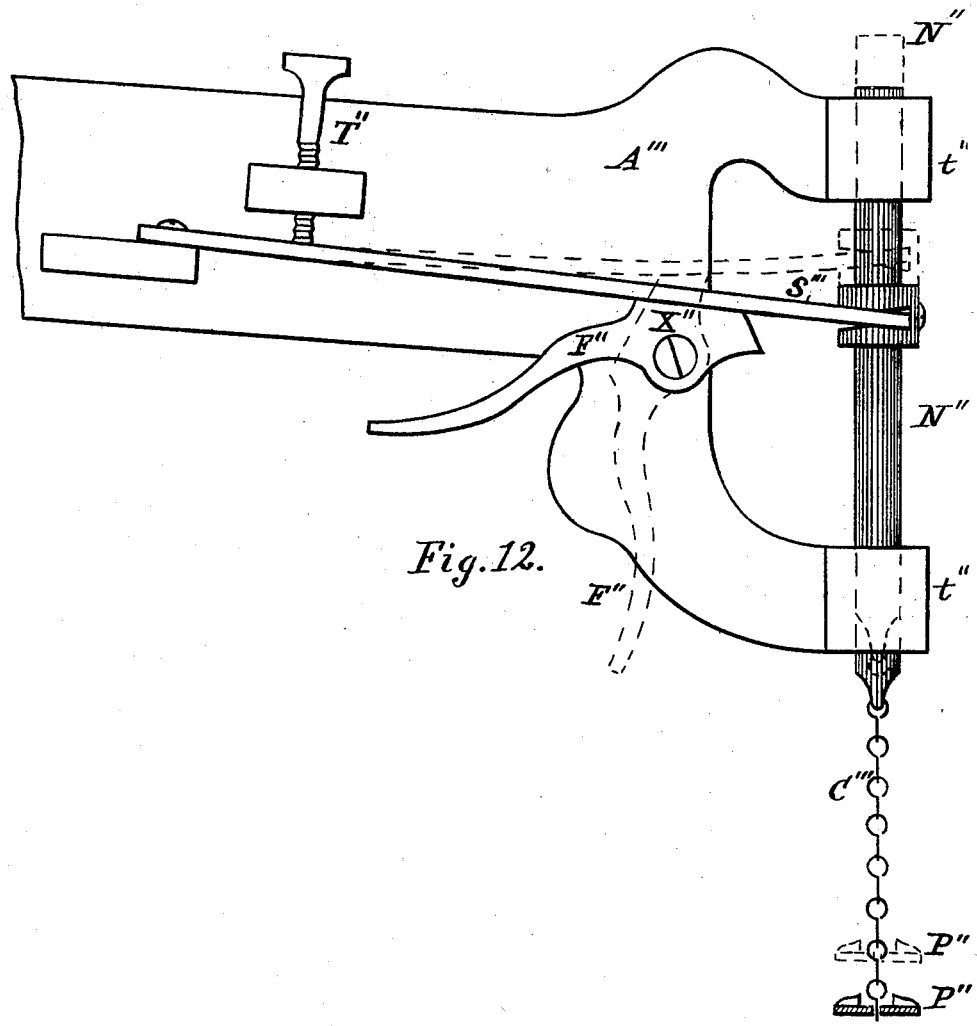
Figure 13:
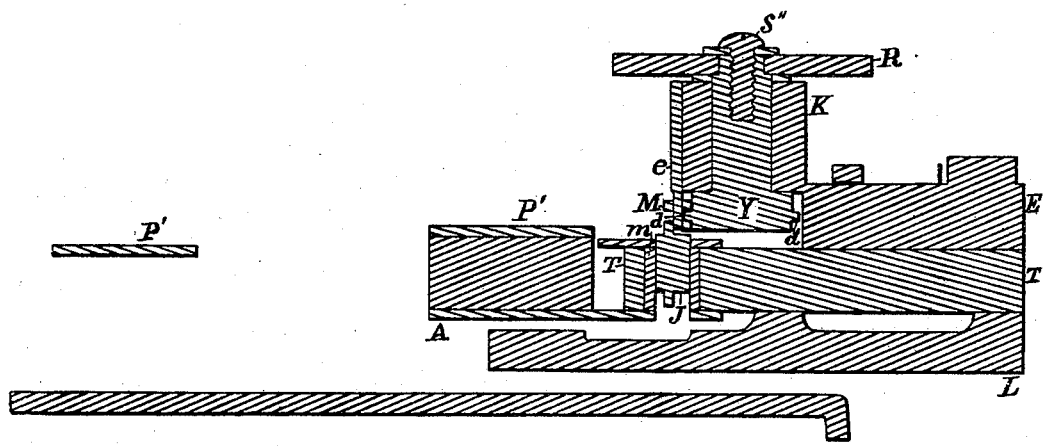

Figure 1 represents a perspective view of my button-hole attachment in its operative relation to the adjacent parts of a sewing-machine. Fig. 2 illustrates in a perspective view my button-hole attachment with the needle-arm and needle-bar, as well as the mechanism moving the cloth-carrier, removed. Fig. 3 shows in perspective and as separated from the attachment (with what would be the base of the parts when in position turned toward the sight) a view of the blade-drum, endless chain, chain-journal, ratchet-wheel, ratchet-wheel shaft, and spur-wheel. Fig. 4 represents in perspective the parts shown in Fig. 2, and in the same position with the exception that the T-shaped sliding bar is removed to show the guideways formed for the latter in the upper face of the angular lever, and to illustrate the position and construction of the sliding bar formed on and attached to the top of the cloth-carrier that moves in a groove formed for it in the bottom of the T-shaped bar when the latter is in its position and the mechanism connected. This illustration shows the position of the bearing formed in the sliding bar on the carrier, in which the crank-pin moving with the endless chain journals. Fig. 5 illustrates separately and in perspective, as turned over to show its under side, the T-shaped bar representing the groove formed on its under side to receive the sliding bar formed on the top of the carrier; also showing the slot formed in said T-shaped bar for the traverse of the crank-pin which is attached to and moves with the endless chain. Fig. 6 represents the T-shaped bar in perspective separately, and relatively in the position as employed when placed in the groove formed in the angular pivoted lever. This also illustrates a sink formed in the top of the bar and the slot for the traverse of the crank-pin attached to and moving with the chain. Fig. 7 shows the cross cam-grooves on the driving-shaft and their connection with a part of the angular lever as constructed on a Wheeler & Wilson sewing-machine, it being merely illustrated to show how the angular lever is connected when used. Fig. 8 shows the switch-plate and switch illustrated in Fig. 7, with the parts turned over to show the under side. Fig. 9 illustrates the switch and pin in which the former turns in the cross-grooved cam formed on the driving-shaft. Fig. 10 represents a section taken vertically through the switch-plate, sleeve, pin, and set-screw, which connect the cross-grooved cam on the driving-shaft with the angular pivoted lever, taken on the line *b b* of Fig. 7. Fig. 11 illustrates a vertical section taken on the line *x x* of Fig. 2 to show a link formed in the angular lever below the carrier and guide-slide to receive a leaf-spring placed beneath the cloth-carrier within the sink to force the carrier upwardly and keep its guide-slide within the recessed groove produced within the T-form bar at its bottom. Fig. 12 illustrates the apparatus used to raise the foot of the cloth-presser, and in which a chain connects the presser-foot with the vertical bar that is actuated by means of the usual spring and hinged lever. Fig. 13 represents a vertical sectional view taken through the center of the ratchet-wheel, ratchet-wheel shaft, blade-drum, chain, and crank-pinion journal.

Figs. 1 and 2 represent parts of a Wheeler & Wilson sewing-machine, and the latter, though no part of my invention, is shown to illustrate the manner in which the angular lever is operated to actuate the ratchet-wheel and connected mechanism when my invention is applied to this kind of a sewing-machine.

The various parts of the sewing-machine and those composing my invention are designated by letter-reference as follows, and their connected co-operation is thus described.

The letters O O O designate the table or table-top of a sewing-machine, through which the needle moves to form the stitches through the apperture $L^4$, around and in the track of which needle the fabric is moved to produce the line of stitching required to produce a button-hole.

The letters L L L designate an angular lever, which is pivoted to the table at B, and is actuated to reciprocatingly swing on its pivoted connection in a plane parallel to the table-top by means of a connecting-pin and a cross-grooved cam formed on the driving-shaft of the machine. The latter, being no part of my invention considered separately, is merely illustrated and described to show its application to a sewing-machine thus constructed and the manner of connecting my invention with it.

The cloth-carrier is designated at A A A and at P' P' the cloth-presser, the latter having the presser-foot P'' P''. The cloth-carrier and the combined presser and presser-foot are constructed to move together, being attached as shown at $a\ a$, and as connected constitute the cloth-carrying mechanism.

Upon the end of the cloth-carrier, beyond where united to the presser, there is formed the upwardly-projecting sliding bar $m$, and this fits into the groove-slide $n$, produced upon the under side of the T-shaped bar shown at Figs. 5 and 6, and with the bar designated at T, and this bar, when in position, fits into the sinks or grooves C', C', and C'', formed in the top of the angular lever, as shown in applied position at Fig. 2.

At R, Figs. 1 and 3, there is shown a ratchet-wheel, which in Fig. 1 is represented in its position as connected with the other parts of the mechanism and at Fig. 3 removed from its connection, and it and the parts with which it immediately connects turned upon their sides, so as to show at the front what is their under side when in position as shown at Fig. 1. This ratchet-wheel R has a shaft, S, passing through the jaw-shaped plate-support K, and upon the end opposite to that to which the ratchet-wheel is attached, and on the same shaft, is placed the spur-wheel Y, the teeth of which, as shown at $d\ d\ d$, dog into or engage with an endless chain, M, and so as to move the latter around a flat blade-drum, $e$, and this endless chain has formed in it and attached, so as to move with it, the vertical shaft and journal J. When the connected parts shown in Fig. 3 are in position, as shown in Fig. 1, this vertical shaft and journal J has its bearing in the bar $m$, formed in the top of the cloth-carrier A, this bearing being for the shaft-journal, and designated at C. There is produced in the top of the bar T a sink, $a''$, and in the center of this sink a longitudinal slot, O'', for the traverse and passage of the vertical crank pin or journal J, and the bar T is arranged so as to move outward and inward in the sink or groove C'', (shown in Fig. 4,) the operation of these combined parts being as follows: When the ratchet-wheel R on the shaft S is intermittently actuated to turn one or more teeth progressively in rotation by means of the dog D', pivoted at D'', and with which the ratchet-wheel is forced to engage by means of the spring $S^4$ at every reciprocation of the angular lever L, the spur-wheel Y, upon the same shaft as the ratchet-wheel, by means of its peripheral teeth $d\ d\ d$, will engage with the endless chain M and carry it around the flat drum $e$, and with it the attached crank pin or journal J, the latter being connected with the cloth-carrier A at C by means of the vertical bearing shown. The crank pin or journal thus connected with the carrier moves the latter and the fabric beneath the plane of the vertical traverse of the needle (indicated at $L^4$, Fig. 1) in a line of direction corresponding to that traveled by the chain and said crank pin or journal, with the cloth-carrying mechanism guided as follows: While the cloth-carrier is moving the fabric beneath the traverse of the needle to stitch the sides of the button-hole the carrier moves in the slide formed in the T-shaped bar produced by the groove N in the latter and the bar $m$ on the bottom of the carrier, and in connected sequence after each side is stitched the carrier is guided across to stitch each end of the button-hole by the movement of the bar T in the slide C''. Thus the ratchet-wheel, its shaft, spur-wheel, blade-drum, endless chain, and connected crank pin or journal perform a specific office as a combination in giving to the cloth-carrying mechanism a line of motion, and which thus impelled would perform substantially the same office, whether the means shown as guiding it were employed or some other equivalent means were used.

At C''', Figs. 1 and 12, there is shown a chain connecting the presser-foot P'' with the vertically-sliding presser-bar N'', arranged to slide in the frame of the machine in guideways, as shown at $t''\ t''$, the frame being attached to the machine-arm, (shown at A''',) the bar N'' and spring S''', as well as the hinged lever F'' F''', used in operating the spring to raise the foot, being the well-known mechanism employed for that purpose. In this illustration a dotted line designates the position of the parts with the presser-foot raised. When the bar N'' rigidly connects with the presser-foot and connected carrier it vertically resists the horizontal motion of the latter in carrying the fabric around and beneath the plane of the vertical traverse of the needle; and to remedy this difficulty I combine with the sliding bar N'' the chain C''', the links of which lift the presser-foot in connection with the actuated bar as well as the bar would if continued down to connect with the foot, and which links are not laterally rigid when the foot is pressed down on the fabric and do not resist the horizontal motion of the mechanism moving the fabric. By means of the hook $C^4$ formed in the chain-links the parts may be connected and disconnected, as desired.

At Fig. 11, which is a vertical section taken on the line X X of Fig. 2, there is shown a sink, $w$, that is formed in the upper face of the angular lever L, in which sink there is placed the leaf-spring $u$, its function being to force upwardly the carrier A and its sliding bar $m$ in the groove formed in the bottom of the bar T, (indicated at $n$.)

The letter $F^4$ designates the connection made with the switch-plate Y'' and switch $T^4$, working in the cross cam-grooves $e^4 e^4$, formed upon the drum $d^4$, attached to the driving-shaft $S^6$, and by which the angular lever L is caused to vibrate horizontally on its pivoted connection made with the machine-table at B. As the angular lever reciprocates the pawl-dog D', pivoted at D'', actuates the ratchet-wheel R to move the machine, the dog D' being held in engaging contact with the ratchet-wheel by means of the spring $S^4$, attached to the back of the pawl-dog and placed between it and the upright $d^3$, the latter being formed on the plate K, having the recess $r$ to receive the spring.

I am well aware that the cloth-presser P', with its presser-foot P'', and the connected cloth-carrier A have been employed by others in machines designed for the same purpose, and considered by themselves are not new.

I am also aware that the T-form bar T has also been before employed in a manner designed to guide the cloth-carrying mechanism when the latter was suddenly switched laterally and after having guided the cloth-carrying mechanism to stitch one side of the button-hole to sew the other, leaving at the ends of the button-hole, between the two parallel rows of stitches, an intervening space where no stitches were formed and where their production was not needed. As employed by me the bar T performs no such function, it being combined to operate with other and differing mechanism, where it serves to guide the combined cloth carrier and presser so that the latter shall pass the fabric beneath the needle's traverse as actuated by the chain, journal, and shaft, so as to form a button-hole by means of a continuous row of stitches, and this difference in results produced resulting from the two different applications of the bar. As the ratchet-wheel R requires for its propulsion an engaging pawl-dog that will intermittently actuate it to move one or more teeth in rotation at each revolution of the driving-shaft of the sewing-machine, and this ratchet-wheel, its shaft and spur-wheel, the endless chain, connected crank pin or journal, and blade-drum, as combined and constructed to operate in connection with the bar T, will move the cloth-carrying mechanism beneath the vertical traverse of the needle in the same manner, whether the pawl-dog actuating the ratchet-wheel were operated by mechanism directly from the driving-shaft of the machine or by means of the angular pivoted lever L, as shown, provided sinks corresponding to those shown at C' C' C'', as formed in the top of the angular lever, are produced in the table-top. Hence I do not limit my invention as relates to these factors to their combination with the angular lever, for they will perform the same office in the same manner by any connected mechanism that will actuate the ratchet-wheel to turn one or more teeth at each rotation of the sewing-machine.

Having thus described my invention, what I claim, and desire to secure by Letters Patent, is—

1. In a button-hole attachment for a sewing-machine, the combination of a ratchet-wheel, a vertical shaft to which the latter is connected, a spur-wheel on said shaft and attached thereto, a pawl for imparting rotary movement to said ratchet-wheel, an endless chain having a crank pin or journal firmly secured thereto, and a blade-drum around which said chain is adapted to be moved by said spur-wheel, substantially as herein described, and for the purposes set forth.

2. In a button-hole attachment to a sewing-machine, the combination of a ratchet-wheel having a vertical shaft, a spur-wheel upon and constructed to move with the latter, a pawl for imparting motion to said ratchet-wheel, an endless chain having a crank pin or journal firmly secured thereto, a flat blade-drum around which said chain is adapted to be moved by said spur-wheel, a cloth-carrying mechanism connected to move with said journal, and the bar T, constructed to operate as herein shown and described.

3. In a button-hole attachment to a sewing-machine, the combination of an endless chain, M, its attached journal or pin, the blade-drum $e$, the cloth-carrying mechanism A, and the spur-wheel Y, with the latter constructed to move the chain, as and for the purposes herein described.

4. In a button-hole attachment to a sewing-machine, the combination of the endless chain M, its attached journal or pin J, the flat blade-drum $e$, bar T, cloth-carrier A, and the spur-wheel Y, with the latter constructed to actuate the chain, as shown and described.

5. In a button-hole attachment to a sewing-machine, the combination of the presser-foot P''', the chain C''', the latter being constructed to hook to or be unhooked from the presser-foot, the pivoted lever F''', and the presser-bar N'', arranged to operate as shown and described.

Signed at Troy, New York, this 20th day of October, 1880.

WILLIAM HENRY CARR.

Witnesses:
  I. L. BURKE,
  R. B. HERRICK.